US009376916B2

(12) United States Patent
McCaffrey et al.

(10) Patent No.: US 9,376,916 B2
(45) Date of Patent: Jun. 28, 2016

(54) ASSEMBLED BLADE PLATFORM

(75) Inventors: Michael G. McCaffrey, Windsor, CT (US); Gregory H. Hasko, Southington, CT (US); Michael G. Abbott, Jupiter, FL (US)

(73) Assignee: United Technologies Corporation, Hartford, CT (US)

( * ) Notice: Subject to any disclaimer, the term of this patent is extended or adjusted under 35 U.S.C. 154(b) by 1040 days.

(21) Appl. No.: 13/488,968

(22) Filed: Jun. 5, 2012

(65) Prior Publication Data

US 2013/0323073 A1 Dec. 5, 2013

(51) Int. Cl.
*F01D 5/14* (2006.01)

(52) U.S. Cl.
CPC ........... *F01D 5/147* (2013.01); *Y10T 29/49336* (2015.01)

(58) Field of Classification Search
CPC ......... F01D 5/147; F01D 5/22; F01D 5/3007; Y10T 29/49336; Y10T 29/49337
See application file for complete search history.

(56) References Cited

U.S. PATENT DOCUMENTS 4,045,149 A * 8/1977 Ravenhall ..................... 416/135
4,802,824 A 2/1989 Gastebois et al.
5,318,406 A 6/1994 Bardes
6,196,794 B1 3/2001 Matsumoto
6,648,597 B1 11/2003 Widrig et al.
6,652,228 B2 11/2003 Tiemann
7,093,359 B2 8/2006 Morrison et al.
7,510,379 B2 3/2009 Marusko et al.
7,762,781 B1 7/2010 Brown et al.
7,972,113 B1 * 7/2011 Davies ...................... 416/214 A
8,714,932 B2 * 5/2014 Noe et al. .................. 416/241 B
2005/0076504 A1 4/2005 A. Morrison et al.
2005/0254942 A1 * 11/2005 Morrison et al. ............. 415/200
2007/0116575 A1 5/2007 James
2009/0185912 A1 7/2009 Walker et al.
2011/0027098 A1 2/2011 Noe et al.
2011/0293828 A1 12/2011 Eberling-Fux et al.
2012/0055609 A1 3/2012 Blanchard et al.
2012/0099982 A1 4/2012 Coupe et al.

FOREIGN PATENT DOCUMENTS

EP 1367037 A2 12/2003
EP 1801354 A2 6/2007
EP 2392778 A2 12/2011
WO 2010/077401 A2 7/2010

(Continued)

OTHER PUBLICATIONS

International Preliminary Report on Patentability for PCT Application No. PCT/US2013/042846, mailed Dec. 18, 2014.
International Search Report & Written Opinion for International Application No. PCT/US2013/042846 mailed on Mar. 25, 2014.
European Search Report for EP Application No. 13831702.9 mailed Mar. 18, 2016.

*Primary Examiner* — Craig Kim
*Assistant Examiner* — Brian O Peters
(74) *Attorney, Agent, or Firm* — Carlson, Gaskey & Olds, P.C.

(57) ABSTRACT

A method of making a platform of a blade includes the steps of creating two platform sections by solidifying a material with a fabric in a mold and positioning a band of fabric around the two platform sections to retain an airfoil and define a blade. The method further includes the step of bonding the two platform sections together by solidifying the material to define a platform of a solid material. The platform is not bonded to the airfoil.

30 Claims, 8 Drawing Sheets

44
48a
46
48b
84
86
64

(56) References Cited

FOREIGN PATENT DOCUMENTS

WO 2010/116066 A1 10/2010
WO 2012/001269 A1 1/2012
WO 2012/001278 A1 1/2012

* cited by examiner

ASSEMBLED BLADE PLATFORM

BACKGROUND OF THE INVENTION

Blades of a gas turbine engine can be made of a ceramic matrix composite (CMC) material. Due to the nature of the material, it is difficult to create a ceramic matrix composite blade with an integral platform. The low interlaminar properties make it challenging to design a platform that is not structurally influenced by blade load. Adding plies to the outside of an airfoil and subjecting them to centrifugal loads can result in delamination of the platform, altering the structural capability of the blade.

SUMMARY OF THE INVENTION

A method of making a platform of a blade includes the steps of creating two platform sections by solidifying a material with a fabric in a mold and positioning a band of fabric around the two platform sections to retain an airfoil and define a blade. The method further includes the step of bonding the two platform sections together by solidifying the material to define a platform of a solid material. The platform is not bonded to the airfoil.

In a further non-limiting embodiment of the foregoing method, the fabric and the band of fabric are a ceramic fabric, the solid material is a solid ceramic matrix composite, and the airfoil is made of a ceramic matrix composite.

In a further non-limiting embodiment of the foregoing method, the material is a matrix precursor, and the step of creating two platform sections includes the steps of placing the fabric in the mold, adding the matrix precursor, and heating the fabric and the matrix precursor to a first temperature to cure the matrix precursor to a solid state.

In a further non-limiting embodiment of the foregoing method, the method includes the steps of positioning the blade in a pyrolysis mold prior to the step of bonding the two platform sections together, and the step of bonding the two platform sections together includes heating the blade to a second temperature greater than the first temperature to pyrolyze the material to a solid ceramic matrix composite.

In a further non-limiting embodiment of the foregoing method, the method includes the step of determining a porosity of the two platform sections, wherein, if the step of determining the porosity determines that the porosity of the two platform sections is greater than a target porosity, the method includes the step of dipping the blade in the material, positioning the blade in the pyrolysis mold, and heating the blade to convert the material to the solid ceramic matrix composite.

In a further non-limiting embodiment of the foregoing method, the material is a matrix precursor, and the step of creating the two platform sections includes adding hot melted glass to the fabric in the mold and the step of bonding the two platform sections together includes adding the hot melted glass to the fabric of the two platform sections.

In a further non-limiting embodiment of the foregoing method, the material is a matrix, and the step of creating the two platform sections includes depositing the matrix in vapor form on the fabric in the mold and the step of bonding the two platform sections together includes depositing the matrix in vapor form on the fabric of the two platform sections.

In a further non-limiting embodiment of the foregoing method, the method including the steps of creating an additional platform section and positioning the additional platform section proximate to the two platform sections, wherein the step of positioning the band of fabric around the two platform sections includes positioning the band of fabric around the additional platform sections.

In a further non-limiting embodiment of the foregoing method, the material is a matrix precursor, and the step of creating the additional platform section includes the steps of placing fabric in a mold, adding the matrix precursor to the fabric, and curing the matrix precursor to a solid state.

A method of making a platform of a blade includes the step of creating two platform sections by placing a ceramic fabric in a mold, adding a matrix precursor, and curing the matrix precursor to solidify the matrix precursor. The method further includes the step of positioning a band of fabric around the two platform sections, where the band of fabric is a ceramic fabric. The method further includes the steps of locating an airfoil between the two platform sections to define a blade, where the airfoil is a ceramic matrix composite, and adding the matrix precursor to the band of fabric. The method further includes the steps of bonding the two platform sections together to form a platform of a solid ceramic matrix composite, where the step of bonding the two platform sections together includes heating the blade to solidify the matrix precursor in the two platform sections and the band of fabric. The platform is not bonded to the airfoil.

In a further non-limiting embodiment of the foregoing method, the step of curing the matrix precursor includes heating the two platform sections to a first temperature.

In a further non-limiting embodiment of the foregoing method, the method includes the steps of positioning the blade in a pyrolysis mold prior to the step of heating the blade, and the step of heating the blade includes heating the blade to a second temperature greater than the first temperature to pyrolyze the matrix precursor to the solid ceramic matrix composite.

In a further non-limiting embodiment of the foregoing method, the method includes the step of determining a porosity of the two platform sections and the band of fabric, wherein, if the step of determining the porosity determines that the porosity of the two platform sections and the band of fabric is greater than a target porosity, the method includes the step of dipping the blade in the material, positioning the blade in the pyrolysis mold, and heating the blade to convert the material to the solid ceramic matrix composite.

A blade for a gas turbine engine includes an airfoil, a platform that is not bonded to the airfoil, and a band located around and bonded to the platform to retain the platform on the airfoil.

In a further non-limiting embodiment of the foregoing blade for a gas turbine engine, the platform floats relative to the airfoil.

In a further non-limiting embodiment of the foregoing blade for a gas turbine engine, the platform includes two platform sections bonded together to define the platform, and the airfoil is located between the two platform sections.

In a further non-limiting embodiment of the foregoing blade for a gas turbine engine, the platform includes an additional platform section positioned proximate to the two platform sections, and the band is located around the additional platform section.

In a further non-limiting embodiment of the foregoing blade for a gas turbine engine, the platform completely surrounds the airfoil.

In a further non-limiting embodiment of the foregoing blade for a gas turbine engine, the platform and the band are made of a solid ceramic matrix composite.

In a further non-limiting embodiment of the foregoing blade for a gas turbine engine, the airfoil is made of a ceramic matrix composite.

These and other features of the present invention can be best understood from the following specification and drawings, the following of which is a brief description.

DETAILED DESCRIPTION OF THE PREFERRED EMBODIMENTS

Figure 1:
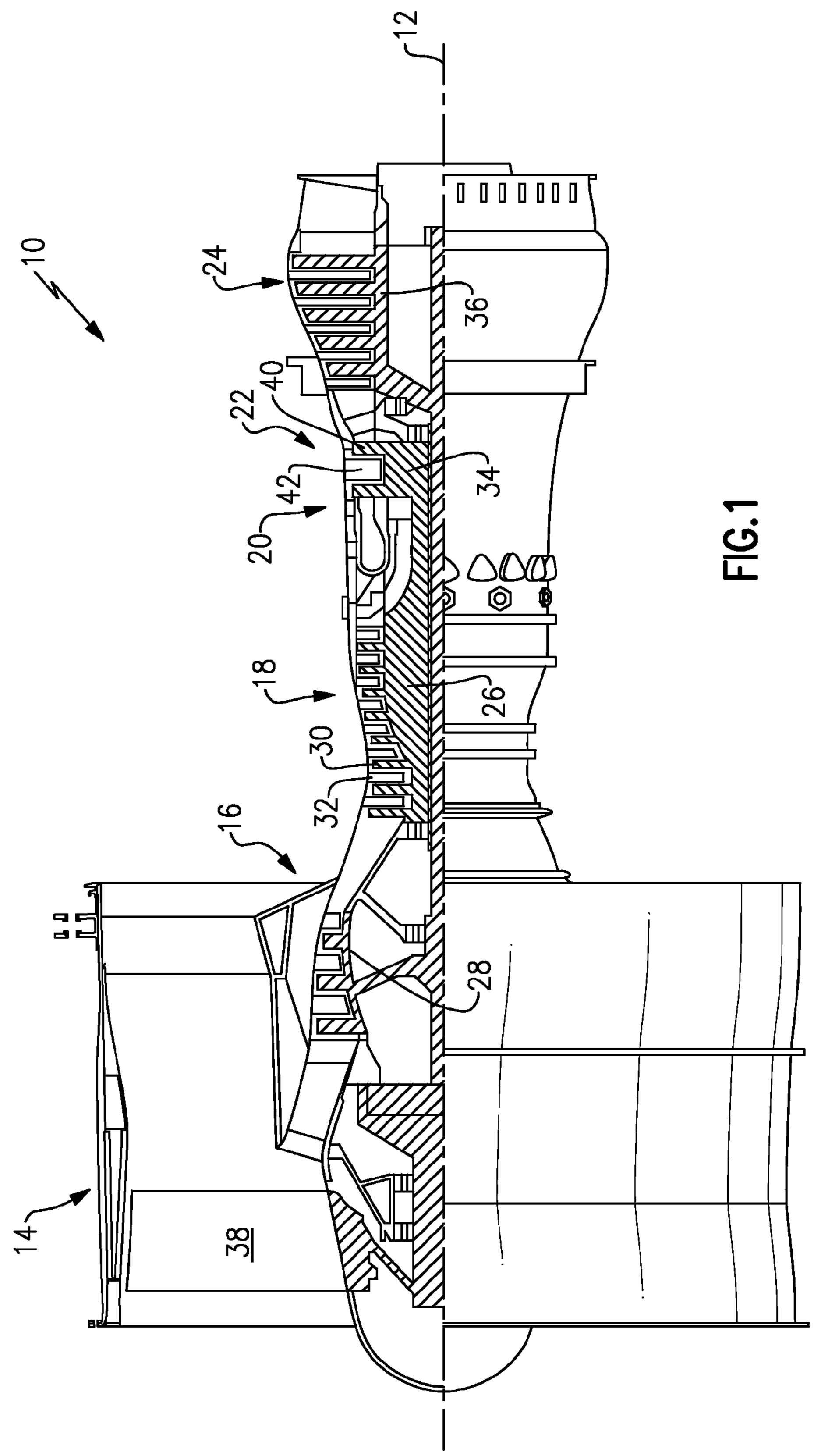
FIG. 1 illustrates a simplified cross-sectional view of a standard gas turbine engine.

FIG. 1 illustrates an example turbomachine, which is a gas turbine engine 10 in this example. The concepts described herein could also be used in other turbomachine environments, such as automotive applications, industrial gas turbine applications, or auxiliary power unit applications.

The gas turbine engine 10 is circumferentially disposed about an axis 12. The gas turbine engine 10 includes a fan section 14, a low-pressure compressor section 16, a high-pressure compressor section 18, a combustion section 20, a high-pressure turbine section 22, and a low-pressure turbine section 24.

During operation, air is compressed in the low-pressure compressor section 16 and the high-pressure compressor section 18. The compressed air is then mixed with fuel and burned in the combustion section 20. The products of combustion are expanded across the high-pressure turbine section 22 and the low-pressure turbine section 24.

The high-pressure compressor section 18 and the low-pressure compressor section 16 include rotors 26 and 28, respectively. The rotors 26 and 28 are configured to rotate about the axis 12, driving the compressors 16 and 18. The compressors 16 and 18 include alternating rows of rotating compressor blades 30 and static airfoils or vanes 32.

The high-pressure turbine section 22 includes a rotor 34 that is rotatably coupled to the rotor 26, and the low-pressure turbine section 24 includes a rotor 36 that is rotatably coupled to the rotor 28. The rotors 34 and 36 are configured to rotate about the axis 12 in response to expansion. When rotated, the rotors 34 and 36 drive the high-pressure compressor section 18 and the low-pressure compressor section 16. The rotor 36 also rotatably drives a fan 38 of the fan section 14. The turbines 22 and 24 include alternating rows of rotating airfoils or turbine blades 40 and static airfoils or vanes 42.

Figure 2:
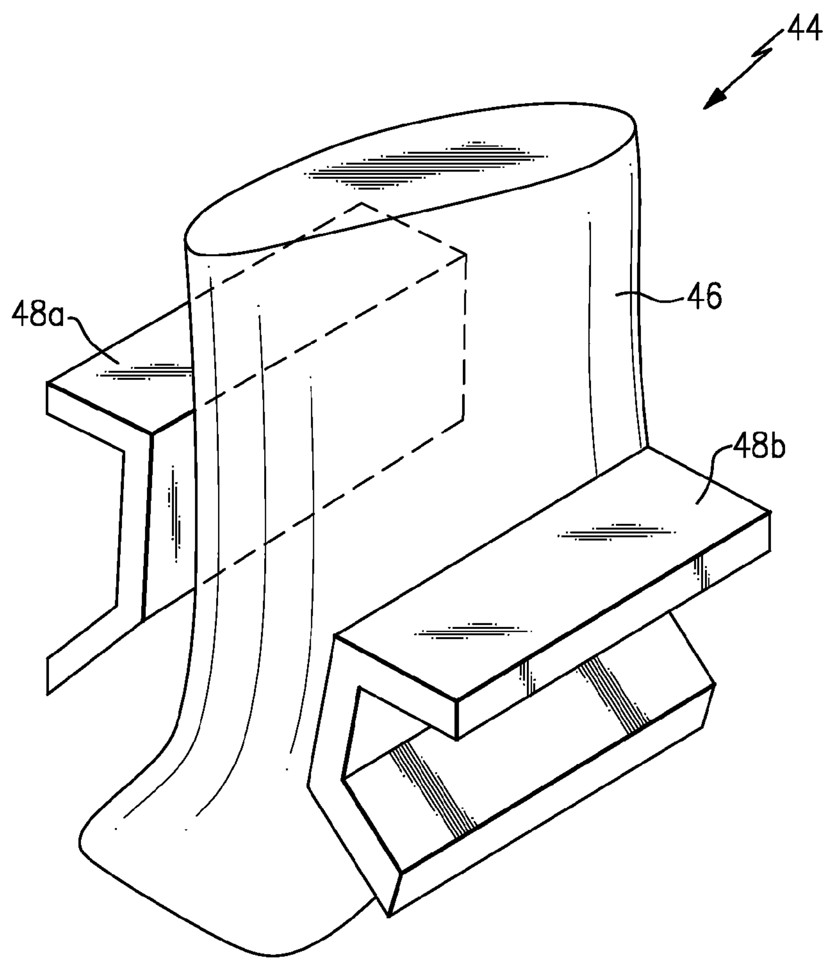
FIG. 2 illustrates a perspective exploded of a blade including an airfoil and two platform sections.

FIG. 2 illustrates a blade 44. The blade 44 can be a compressor blade used in any stage of the low-pressure compressor 16 or the high-pressure compressor 18 or a turbine blade used in any stage of the high-pressure turbine 22 or the low-pressure turbine 24. The blade includes an airfoil 46 and a platform 48. The airfoil 46 is formed of a ceramic matrix composite (CMC). The platform 48 is a separate component from the airfoil 46 and is made of ceramic fabric 56, as explained below. Although a blade 44 is illustrated and described, the described method can also be employed to create a compressor vane used in any stage of the low-pressure compressor 16 or the high-pressure compressor 18 or a turbine vane used in any stage of the high-pressure turbine 22 or the low-pressure turbine 24.

Figure 3:
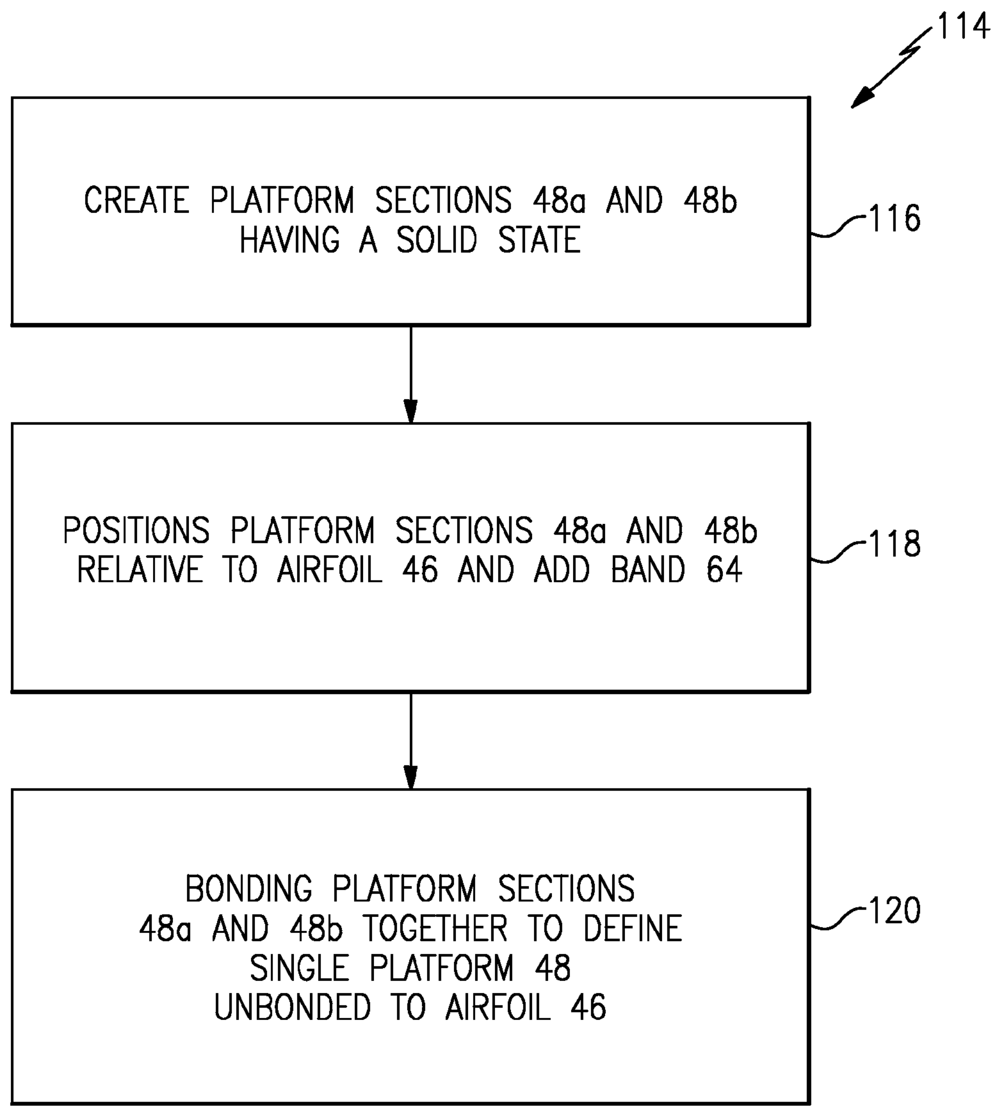
FIG. 3 illustrates a method of making the blade.
Figure 5:
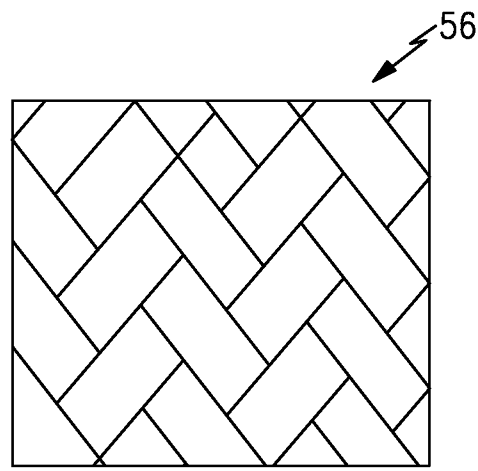
FIG. 5 illustrates a piece of ceramic fabric.

FIG. 3 illustrates a method 114 of making the blade 44. In step 116, platform sections **48*a* and 48*b* are created and have a solid state, but the platform sections 48*a* and 48*b* are not yet solid. In step 118, the platform sections 48*a* and 48*b* are positioned relative to the airfoil 46, and a band 64 is positioned around the platform sections 48*a* and 48*b*. In step 120, the platform sections 48*a* and 48*b* are bonded together to define a single platform 48 that is not bonded to the airfoil 46. In one example, the platforms sections 48*a* and 48*b* are solidified while during the step of bonding to define the single platform 48** of solid ceramic matrix composite.

FIGS. 4 to 7 illustrate a first example method of making the blade 44. In the first example method, the step 116 of creating the platform sections **48*a* and 48*b* includes a curing process, and the step 120 of bonding and solidifying the platform sections 48*a* and 48*b*** includes a pyrolysis process.

Figure 4:
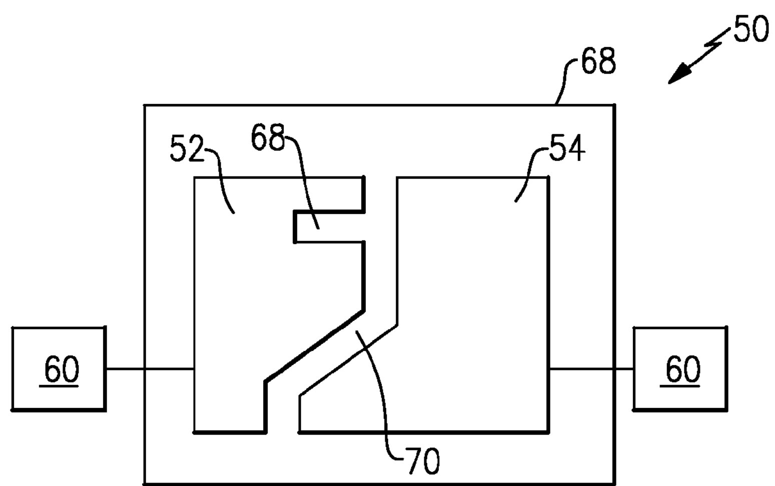
FIG. 4 illustrates a mold employed to form the platform section of the blade and located in a first furnace in a first example method of making the blade.

As shown schematically in FIG. 4, in the step 116, ceramic fabric 56 is positioned in mold portions 52 and 54 of a mold 50. In one example, the ceramic fabric 56 is woven, tape, or knitted. In one example shown in FIG. 5, the ceramic fabric 56 is a fabric having a three-dimensional weave. In one example, the ceramic fabric 56 is silicon carbide fabric. In another example, the ceramic fabric 56 is silicon carbide-carbon fabric.

In one example, a matrix precursor 58 (shown in FIG. 7) is added to or injected into the ceramic fabric 56 while the ceramic fabric 56 is located in the mold 50. In another example, the ceramic fabric 56 is pre-impregnated with the matrix precursor 58 prior to being positioned in the mold portions 52 and 54. In one example, the matrix precursor 58 is a polycarbosilane pre-ceramic matrix precursor. In one example, the matrix precursor 58 is a liquid resin.

The mold 50 is then transferred to a first furnace 68 and heated to a first temperature, and compression is applied by a compression unit 60. The matrix precursor 58 cures at a low temperature (green formed). After curing, the platform sections **48*a* and 48*b* are formed. The platform sections 48*a* and 48*b* are not ceramic, but the matrix precursor 58 in the ceramic fabric 56 has cured around the ceramic fabric 56 to a solid state. The platform sections 48*a* and 48*b* are allowed to cool and are then removed from the mold 50**.

Figure 6:
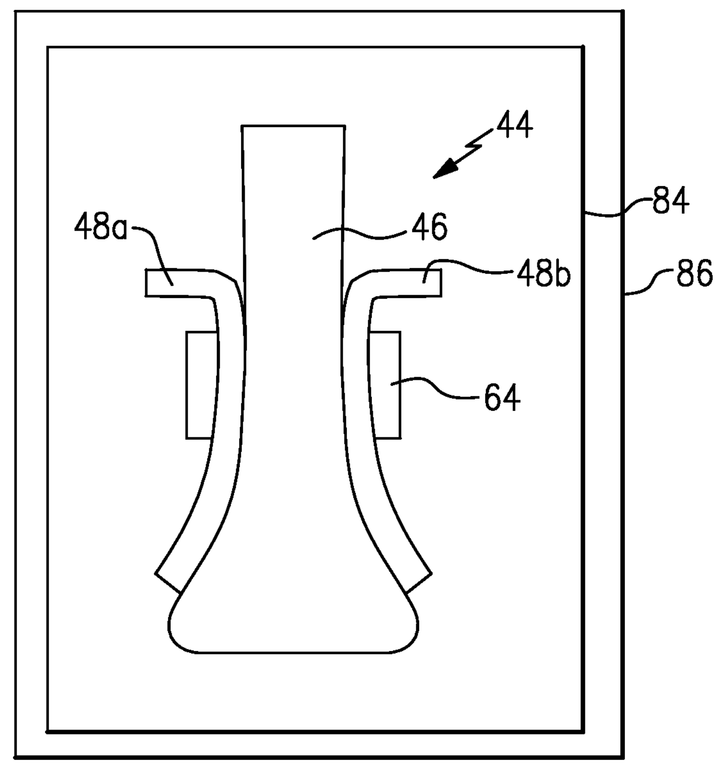
FIG. 6 illustrates a cross-sectional rear view of the airfoil, the platform sections, and a band placed in a pyrolysis tool and a second furnace in the first example method of making the blade.

As shown in FIG. 6, a band 64 is wrapped around the platform sections **48*a* and 48*b*, and the airfoil 46 is inserted between the platform sections 48*a* and 48*b* such that the platform sections 48*a* and 48*b* are positioned on opposing sides of the airfoil 46 (this step correlates to the step 118 of FIG. 3). The platform sections 48*a* and 48*b* are deformable, which help to lock the platform sections 48*a* and 48*b* against the airfoil 46**.

In one example, the band 64 is formed of ceramic fabric 56. In one example, the band 64 is formed of silicon carbide fabric. In one example, the band 64 is woven or a two dimensional ceramic cloth. In one example, the band 64 consists of multiple wraps of a one dimensional piece of ceramic tow. In one example, the band 64 is impregnated with matrix precursor 58 when positioned around the platforms 48. In another example, the matrix precursor 58 is injected into the band 64 after being positioned around the platform sections 48*a* and 48*b*.

The step 120 of bonding and solidifying the platform sections 48*a* and 48*b* includes a pyrolosis process. The airfoil 46, the platform sections 48*a* and 48*b* and the band 64, which together define the blade 44, are positioned in a pyrolosis tool 84 (shown schematically), such as a mold. The pyrolosis tool 84 is then placed in a second furnace 86. In this example, the blade 44 is heated or pyrolyzed in the second furnace 86 to a second temperature that is greater than the first temperature. The heat converts the matrix precursor 58 to a solid ceramic matrix composite. The pyrolosis process bonds the platform sections 48*a* and 48*b* together to define the platform 48. The blade 44 is then allowed to cool and is removed from the second furnace 86 and the pyrolosis tool 84. The blade 44 is then visually inspected.

The porosity of the platforms 48 and the band 64 is determined by dipping the blade 44 into a liquid and measuring the displacement produced by the blade 44. If the porosity is greater than a target porosity, additional pyrolosis cycles are performed to reduce porosity.

If the porosity is above the target porosity, additional pyrolosis cycles are performed. In each cycle, the blade 44 is dipped in the matrix precursor 58, returned to the pyrolosis tool 84, and placed in the second furnace 86. The matrix precursor 58 fill any voids in the ceramic fabric 56 created by the shrinking of the matrix precursor 58 during pyrolosis. The blade 44 is then pyrolyzed and heated to the second temperature, allowed to cool, and removed from the second furnace 86 and the pyrolosis tool 84. The porosity of the blade 44 is then determined by dipping the blade 44 into the liquid. If the porosity of the blade 44 is above the target porosity, another pyrolosis cycle is performed. In one example, five pyrolosis cycles are performed.

Once the platforms 48 and the band 64 are determined to have the target porosity, the ceramic fabric 56 and the matrix precursor 58 form a solid ceramic matrix composite such that the platform sections 48*a* and 48*b* and the band 64 are bonded together to define the platform 48 that is unbonded to the airfoil 46. Once bonded, the platform 48 completely surrounds and floats relative to the airfoil 46. A finishing process, such as machining, can be performed on the blade 44.

Figure 7:
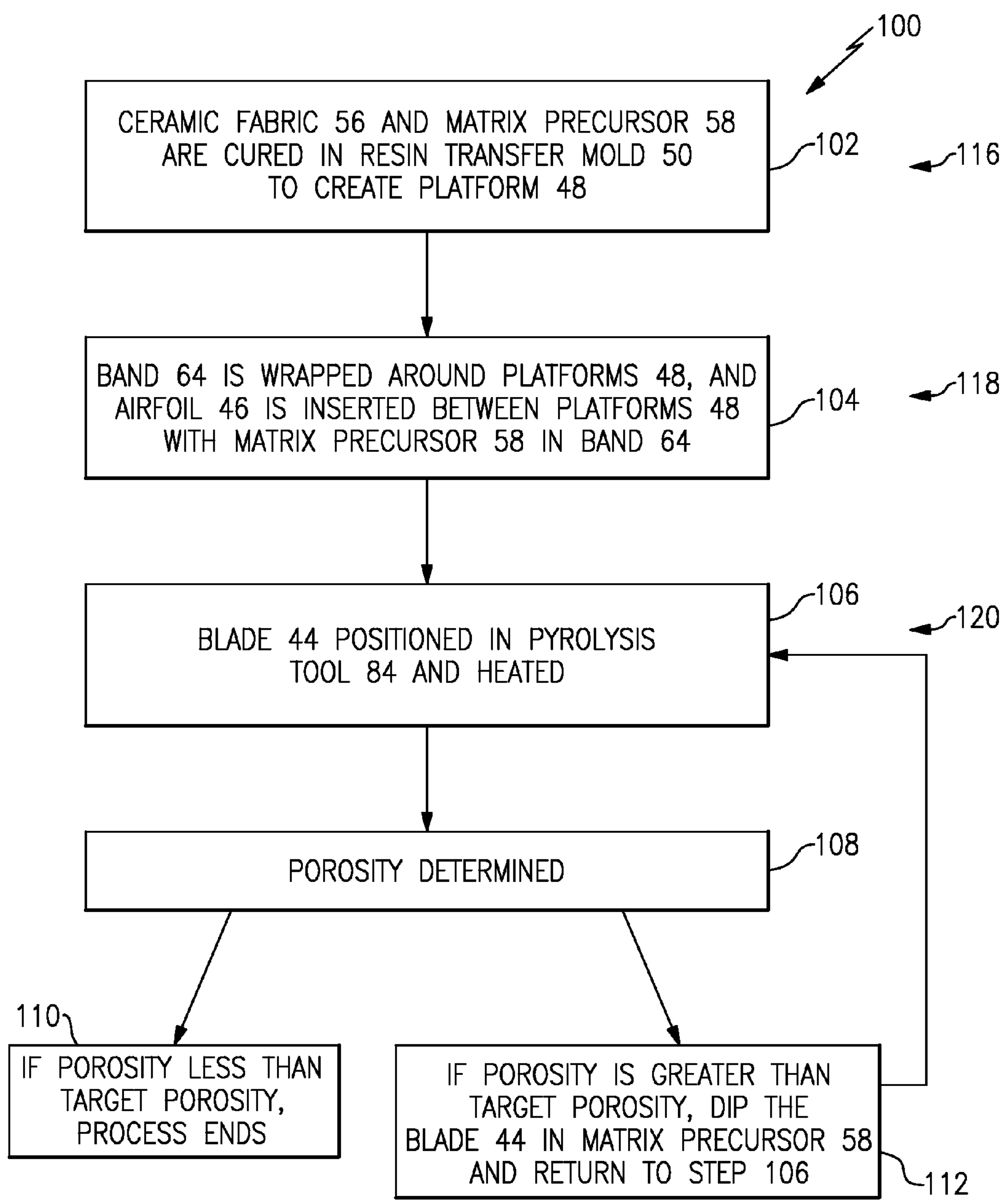
FIG. 7 illustrates the first example method of making the blade.

FIG. 7 illustrates a method 100 of making the blade 44. In step 102, the ceramic fabric 56 and the matrix precursor 58 are cured in a mold 50 to form a platform 48 (step 116). In step 104, the band 64 is wrapped around the platforms 48, and the airfoil 46 is inserted between the platforms 48 (step 118). The matrix precursor 58 is located within the fibers of the band 64. In step 106, the blade 44 is positioned in the pyrolosis tool 84 and heated (step 120). In step 108, the porosity of the platforms 48 and the band 64 are determined. In step 110, if the porosity is below the target porosity, no additional pyrolosis steps are needed. In step 112, if the porosity is above the target porosity, the method 100 returns to step 106, and the blade 44 is dipped in the matrix precursor 58. The steps 106, 108 and 112 are repeated until the porosity is less than the target porosity.

In another example, the airfoil 46 is made of metal, and the platform 48 is formed of an organic matrix composite or a polymer matrix composite. The fabric 56 is a carbon fiber, and the matric precursor 58 is a polymer. In one example, the polymer is epoxy or polyester. The method 100 is employed to make the platform 48.

Figure 8:
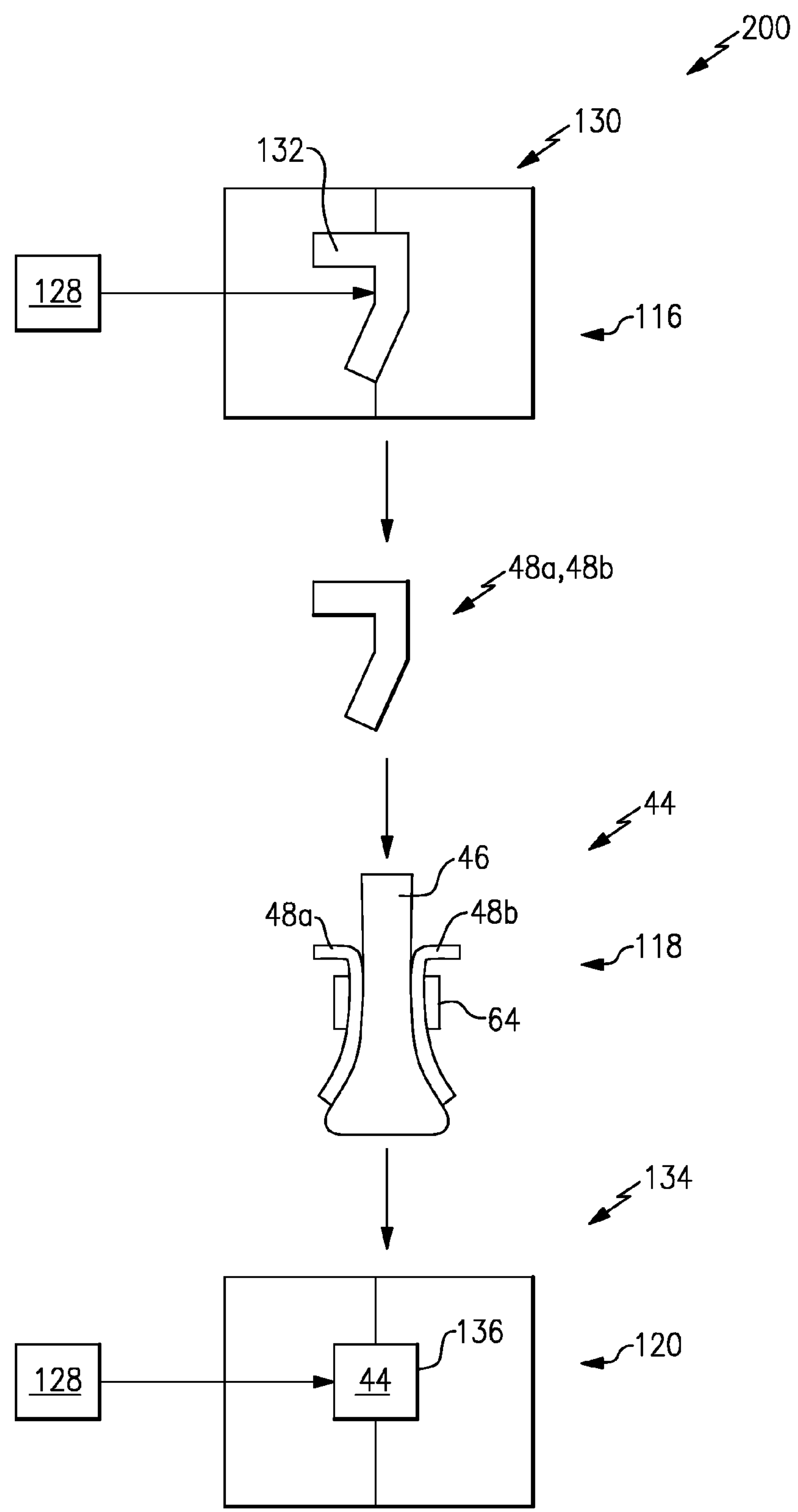
FIG. 8 illustrates a second example method of making the blade.

FIG. 8 shows a second example method 200 of making the blade 44. In the second example method, the platform sections 48*a* and 48*b* are formed by glass injection. In the step 116, the ceramic fabric 56 is located in a mold 130 having a cavity 132 defining the shape of a platform section 48*a* or 48*b*, and hot melted glass 128 is injected into the cavity 132 and flows into spaces located between fibers of the ceramic fabric 56 in the mold 130. The melted glass 128 is allowed to cool to form a solid ceramic matrix composite, and the solid platform section 48*a* or 48*b* is removed from the mold 130. Next, in the step 118, the band 64 is positioned around the platform sections 48*a* and 48*b* and the airfoil 46 to define the blade 44. Finally, in the step 120, the blade 44 is positioned in a cavity 136 of a mold 134, and hot melted glass 128 is injected into the cavity 136 and flows into spaces located between fibers of the ceramic fabric 56 of the band 64. The melted glass 128 is allowed to cool to form a solid ceramic matrix composite, and the blade 44 is removed from the mold 130. When cooled, the melted glass located between the fibers of the ceramic fabric 56 of the platform sections 48*a* and 48*b* and the band 64 bonds the platform sections 48*a* and 48*b* together and solidifies to define a solid ceramic matrix composite. The platform 48 is not bonded to the airfoil 46.

Figure 9:
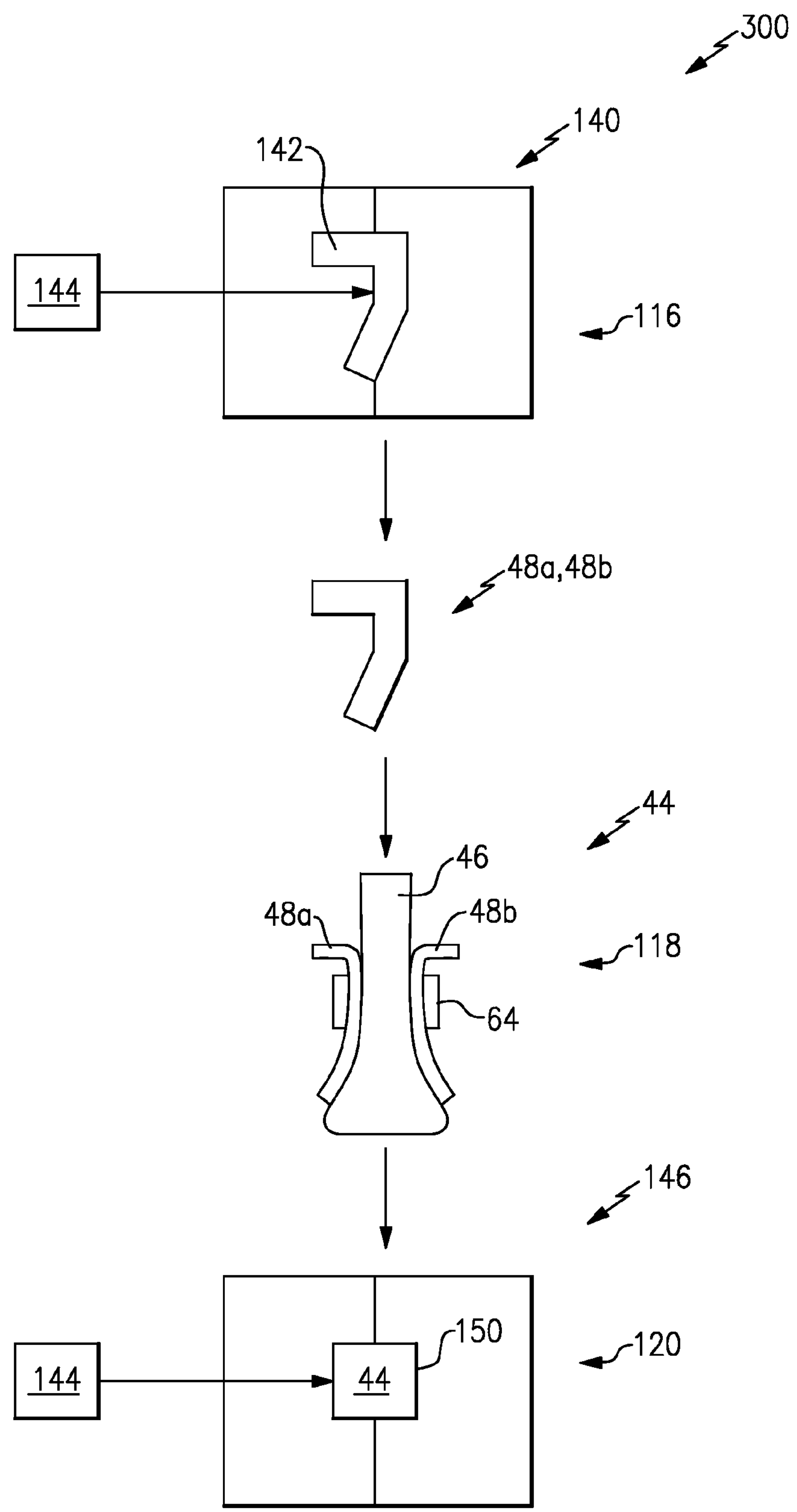
FIG. 9 illustrates a third example method of making the blade.

FIG. 9 illustrates a third example method 300 of making the blade 44. In the third example method, the platform sections 48*a* and 48*b* are formed by chemical vapor deposition (CVD). In the step 116, the ceramic fabric 56 is located in a mold 140 having a cavity 142 defining the shape of a platform section 48*a* or 48*b*. In one example, the mold 140 is a graphite mold. The mold 140 is exposed to high temperatures and a low pressures. A vapor cloud of chemicals 144 is supplied inside the mold 140, and the vapor cloud of chemicals 144 deposits a matrix on the ceramic fabric 56. Once a desired thickness of the matrix is deposited on the ceramic fabric 56, the platform sections 48*a* or 48*b* are complete and defines a solid ceramic matrix composite. Next, in the step 118, the band 64 is positioned around the platform sections 48*a* and 48*b* and the airfoil 46 to define the blade 44. Finally, in the step 120, the blade 44 is positioned in a cavity 150 of a mold 146, and a vapor cloud of chemicals 144 is supplied inside the mold 140. The vapor cloud of chemicals 144 deposits the matrix on the ceramic fabric 56. Once a desired thickness of the matrix is deposited on the ceramic fabric 56 of the band 64, the platform sections 48*a* or 48*b* and the band 64 are complete to define a solid ceramic matrix composite, bonding the platform sections 48*a* and 48*b* together. The platform 48 is not bonded to the airfoil 46.

Although three methods 100, 200 and 300 each having two main steps (the step 116 of creating the platform sections 48*a* and 48*b* and the step 120 of bonding the platforms sections 48*a* and 48*b* together to define a platform 48 that is unbonded to the airfoil 46) are illustrated and described, the step 116 of one method can be used with the step 120 of another method. In one example, the platform sections 48*a* and 48*b* are formed in the step 116 by chemical vapor deposition. However, in the step 120, the platforms sections 48*a* and 48*b* are bonded together employing pyrolosis steps. In another example, the platform sections 48*a* and 48*b* are formed in the step 116 by chemical vapor deposition. However, in the step 120, the platforms sections 48*a* and 48*b* are bonded together by hot glass injection. Any combination of the steps 116 of any of the three methods to form the platform sections 48*a* and 48*b* can be employed with any of the steps 120 of any of the three methods to bond and solidify the platform sections 48*a* and 48*b* into a single platform.

Figure 10:
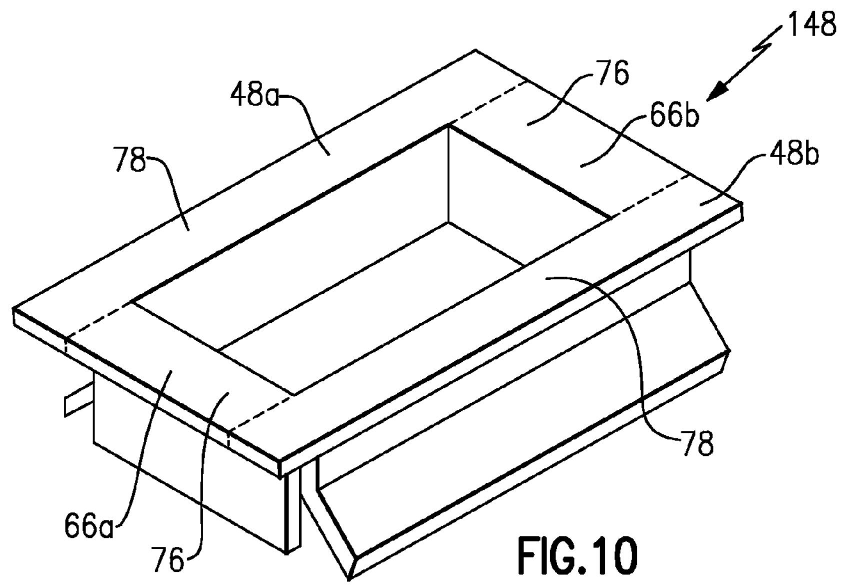
FIG. 10 illustrates a perspective view of an alternate platform including two platform sections and two additional platform sections.

FIG. 10 illustrates an alternate platform 148 formed by two platform sections 48*a* and 48*b* and two additional platform sections 66*a* and 66*b*. The platform 148 is shown after the step 120 when the sections are all bonded to define a single component unbonded to the airfoil 46, but the boundaries between the platform sections 48*a* and 48*b* and the additional platform sections 66*a* and 66*b* that form the platform 148 are shown by dashed lines. The platform 48 can include one platform section 66*a* or 66*b* or two platform sections 66*a* and 66*b* formed by one of the methods of step 116. Returning to FIG. 7, in step 118, the additional platform sections 66*a* and 66*b* are located at the front and the rear, respectively, of the airfoil 46 such that the platform sections 48*a* and 48*b* and the additional platforms 66*a* and 66*b* surround the airfoil 46. In one example, an upper surface 78 of the platform sections 48*a* and 48*b* and an upper surface 76 of the additional platform sections 66*a* and 66*b* are located in a common plane. In one example, a length of the upper surface 78 of the platforms sections 48*a* and 48*b* are greater than a length of a remainder of the platforms sections 48*a* and 48*b*. The additional platform sections 66*a* and 66*b* are solidified and cured in the same manner as the platform sections 148 as described in the step 116. The band 64 is located around the platform sections 48*a* and 48*b* and the additional platform sections 66*a* and 66*b*. In the step 120, the blade 44 is then located in the pyrolosis tool 84, and the platform sections 48*a* and 48*b* and the additional platform sections 66*a* and 66*b* are solidified and bonded together to define the platform 148. The additional platform sections 66*a* and 66*b* provide additional sealing.

Figure 11:
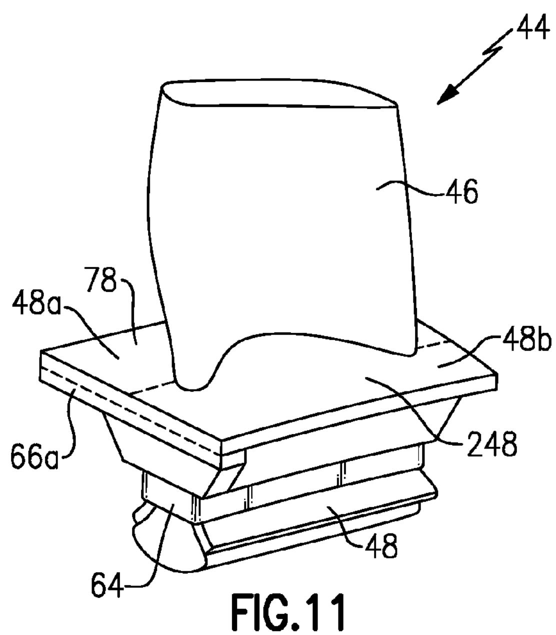
FIG. 11 illustrates a perspective view of a blade including an alternate platform including two platform sections and two additional platform sections.

FIG. 11 shows a blade 44 including another example platform 248 after the step 120. Although the platform 248 is shown after the step 120, the boundaries between the platform sections 48*a* and 48*b* and the additional platform sections 66*a* and 66*b* that form the platform 48 are shown by dashed lines. The upper surface 76 (not shown in FIG. 8) of the additional platform sections 66*a* and 66*b* are located under the platform sections 48*a* and 48*b*, and the band 64 is located around the platform sections 48*a* and 48*b* and the additional platform sections 66*a* and 66*b*.

Figure 12:
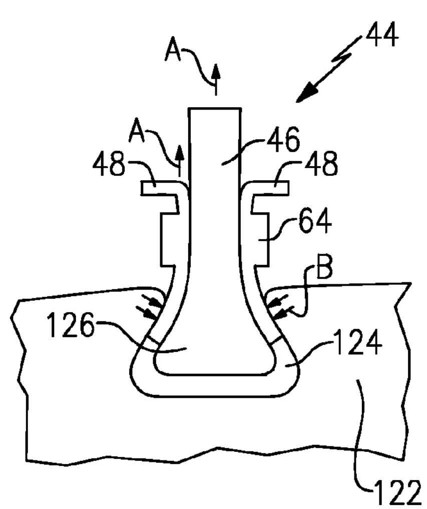
FIG. 12 illustrates a cross-sectional rear view of the blade located in a slot of a turbine disc.

As shown in FIG. 12, the blade 44 is received in a slot 124 of a turbine disk 122. The platform 48 is trapped between the turbine disk 122 and a dovetail region 126 of the blade 44, clamping and retaining the platform 48 in position. That is, the platform 48 "floats" relative to the blade 44, but is retained in place as the platform 48 is formed around the airfoil 46 during the step 120 when the platform sections 48 are solidified and bonded together, trapping the platform 48 between the airfoil 46 and the turbine disk 122. Therefore, the airfoil 46 of ceramic matrix composite does not need to be bonded to the platform 48 or the band 64 to retain the airfoil 46 and the platform 48 in the slot 124 of the turbine disk 122.

Large radial loads on the blade 44 cause the airfoil 46 and the platform 48 to stretch radially in the direction A, as well as shrink in cross-section. The turbine disk 122 presses in a direction B against the platform 48. As the airfoil 46 and the platform 48 are not bonded together, the airfoil 46 can pull away from the platform 48, not create a large delamination load, and can respond in a thermally different manner. The airfoil 46 can be made to looser tolerances, and the process of co-forming and bonding the two platform sections 48*a* and 48*b* to single piece platform 48 absorbs these tolerances. This allows for independent movement of the airfoil 46 and the platform 48 and provides for damping, but still allows for contact of the airfoil 46 and the platform 48.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A method of making a platform of a blade, the method comprising the steps of:

creating two platform sections by solidifying a material with a fabric in a mold;

positioning a band of fabric around the two platform sections to retain an airfoil and define a blade; and bonding the two platform sections together by solidifying the material to define a platform of a solid material, wherein the platform is not bonded to the airfoil.

2. The method as recited in claim 1 wherein the fabric and the band of fabric are a ceramic fabric, the solid material is a solid ceramic matrix composite, and the airfoil is made of a ceramic matrix composite.

3. The method as recited in claim 1 wherein the material is a matrix precursor, and the step of creating the two platform sections includes adding hot melted glass to the fabric in the mold and the step of bonding the two platform sections together includes adding the hot melted glass to the two platform sections.

4. The method as recited in claim 1 wherein the material is a matrix, and the step of creating the two platform sections includes depositing the matrix in vapor form on the fabric in the mold and the step of bonding the two platform sections together includes depositing the matrix in vapor form on the two platform sections.

5. The method as recited in claim 1 including the step of inserting the airfoil between the two platform sections after the step of positioning the band of fabric.

6. The method as recited in claim 1 including the step of deforming the two platform sections to lock the two platform sections against the airfoil.

7. The method as recited in claim 1 including the steps of determining the porosity of the two platform sections and repeating the step of bonding the two platform sections together if the porosity is greater than a target porosity.

8. The method as recited in claim 1 wherein a portion of the airfoil extends above the two platform sections and another portion of the airfoil extends below the two platform sections.

9. The method as recited in claim 1 wherein the band is located about a central portion of the airfoil.

10. The method as recited in claim 1 wherein a portion of the platform is located above the band and another portion of the platform is located below the band.

11. The method as recited in claim 1 including the steps of creating an additional platform section and positioning the additional platform section proximate to the two platform sections, wherein the step of positioning the band of fabric around the two platform sections includes positioning the band of fabric around the additional platform sections.

12. The method as recited in claim 11 wherein the material is a matrix precursor, and the step of creating the additional platform section includes the steps of placing fabric in a mold, adding the matrix precursor to the fabric, and curing the matrix precursor to a solid state.

13. The method as recited in claim 1 wherein the material is a matrix precursor, and the step of creating the two platform sections includes the steps of placing the fabric in the mold, adding the matrix precursor, and heating the fabric and the matrix precursor to a first temperature to cure the matrix precursor to a solid state.

14. The method as recited in claim 13 including the step of positioning the blade in a pyrolysis mold prior to the step of bonding the two platform sections together, and the step of bonding the two platform sections together includes heating the blade to a second temperature greater than the first temperature to pyrolyze the material to a solid ceramic matrix composite.

15. The method as recited in claim 14 including the step of determining a porosity of the two platform sections, wherein, if the step of determining the porosity determines that the porosity of the two platform sections is greater than a target porosity, the method includes the step of dipping the blade in the material, positioning the blade in the pyrolysis mold, and heating the blade to convert the material to the solid ceramic matrix composite.

16. A method of making a platform of a blade, the method comprising the steps of:

creating two platform sections by placing a ceramic fabric in a mold, adding a matrix precursor, and curing the matrix precursor to solidify the matrix precursor;

positioning a band of fabric around the two platform sections, wherein the band of fabric is a ceramic fabric;

locating an airfoil between the two platform sections to define a blade, wherein the airfoil is a ceramic matrix composite;

adding the matrix precursor to the band of fabric; and bonding the two platform sections together to form a platform of a solid ceramic matrix composite, wherein the step of bonding the two platform sections together includes heating the blade to solidify the matrix precursor in the two platform sections and the band of fabric, and the platform is not bonded to the airfoil and floats relative to the airfoil.

17. The method as recited in claim 16 wherein the band is located about a central portion of the airfoil.

18. The method as recited in claim 16 wherein a portion of the platform is located above the band and another portion of the platform is located below the band.

19. The method as recited in claim 16 wherein the step of curing the matrix precursor includes heating the two platform sections to a first temperature.

20. The method as recited in claim 19 including the step of positioning the blade in a pyrolysis mold prior to the step of heating the blade, and the step of heating the blade includes heating the blade to a second temperature greater than the first temperature to pyrolyze the matrix precursor to the solid ceramic matrix composite.

21. The method as recited in claim 20 including the step of determining a porosity of the two platform sections and the band of fabric, wherein, if the step of determining the porosity determines that the porosity of the two platform sections and the band of fabric is greater than a target porosity, the method includes the step of dipping the blade in the material, positioning the blade in the pyrolysis mold, and heating the blade to convert the material to the solid ceramic matrix composite.

22. A blade for a gas turbine engine, the blade comprising:

an airfoil;

a platform that is not bonded to the airfoil, wherein the airfoil floats relative to the platform; and a band located around and bonded to the platform to retain the platform on the airfoil.

23. The blade as recited in claim 22 wherein the platform floats relative to the airfoil.

24. The blade as recited in claim 22 wherein the platform completely surrounds the airfoil.

25. The blade as recited in claim 22 wherein platform and the band are made of a solid ceramic matrix composite.

26. The blade as recited in claim 22 wherein the airfoil is made of a ceramic matrix composite.

27. The blade as recited in claim 22 wherein the band is located about a central portion of the airfoil.

28. The blade as recited in claim 22 wherein a portion of the platform is located above the band and another portion of the platform is located below the band.

29. The blade as recited in claim 22 wherein the platform comprises two platform sections bonded together to define the platform, and the airfoil is located between the two platform sections.

30. The blade as recited in claim 29 wherein the platform comprises an additional platform section positioned proximate to the two platform sections, and the band is located around the additional platform section.

* * * * *